P. F. KLEINERT.
MACHINE FOR FASTENING HOOKS AND EYES ON CARDS.
APPLICATION FILED JUNE 27, 1907.

1,071,643.

Patented Aug. 26, 1913.

13 SHEETS—SHEET 4.

P. F. KLEINERT.
MACHINE FOR FASTENING HOOKS AND EYES ON CARDS.
APPLICATION FILED JUNE 27, 1907.
1,071,643.
Patented Aug. 26, 1913.
13 SHEETS—SHEET 5.
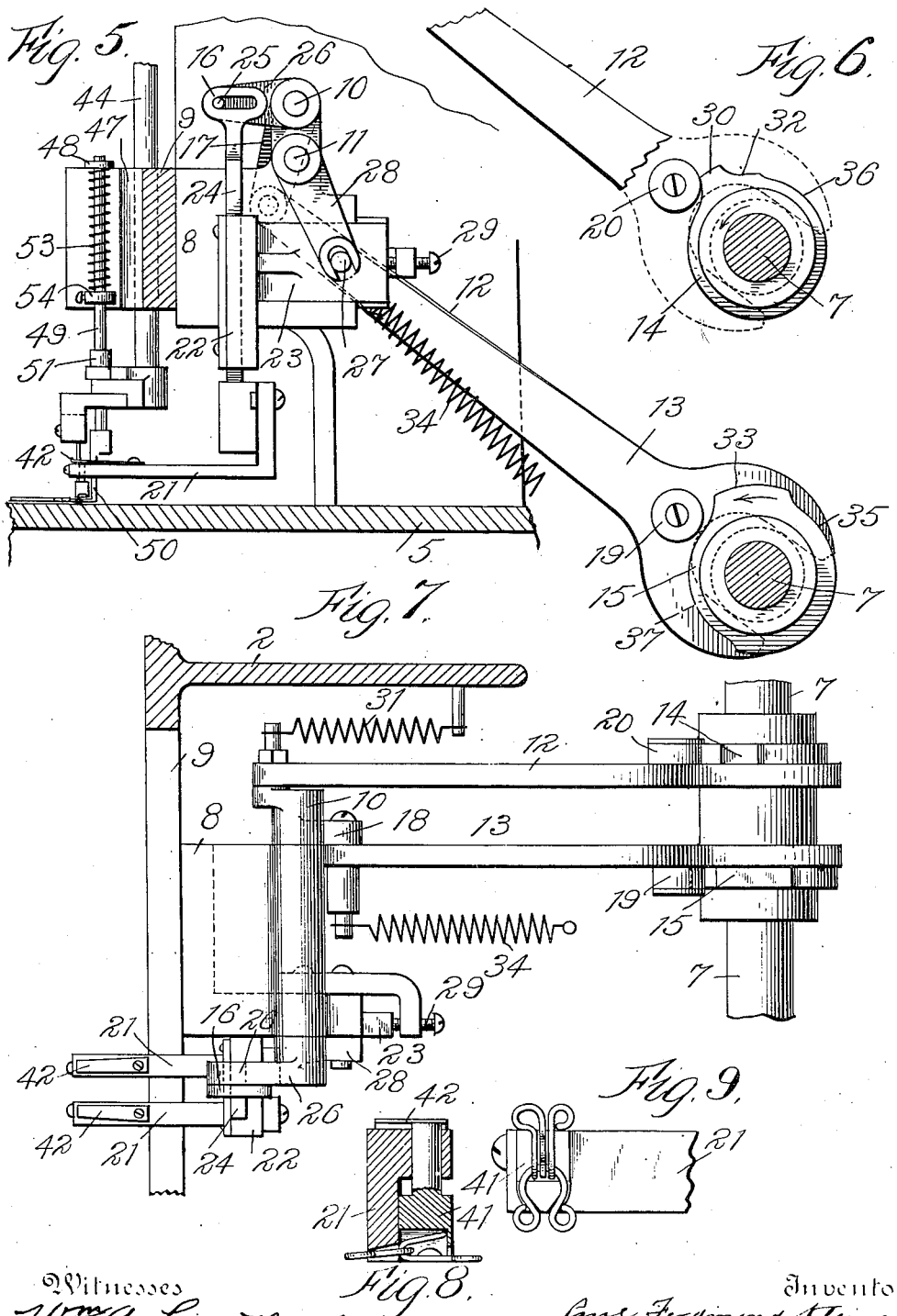

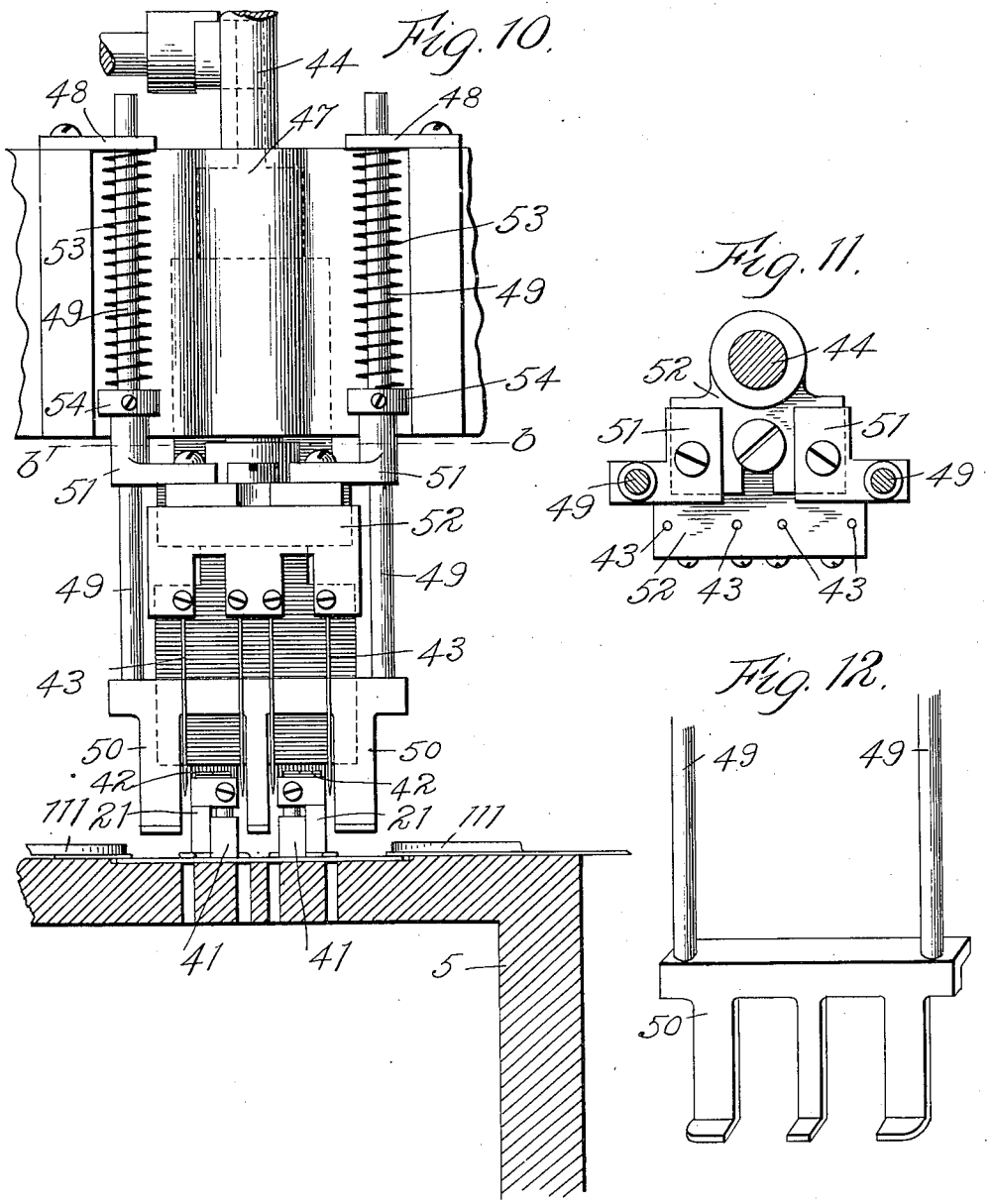

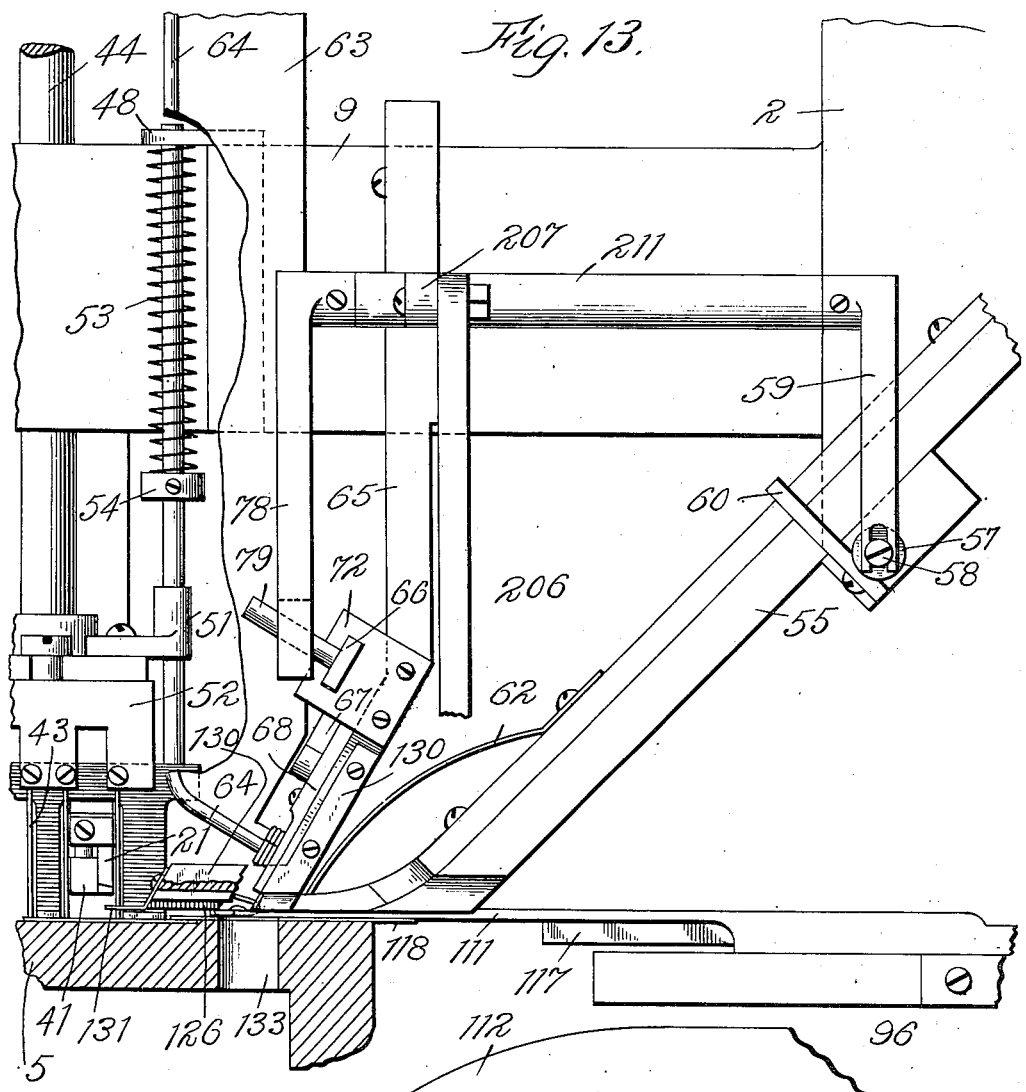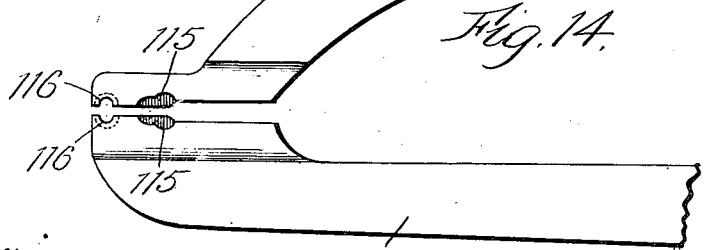

P. F. KLEINERT.
MACHINE FOR FASTENING HOOKS AND EYES ON CARDS.
APPLICATION FILED JUNE 27, 1907.
1,071,643.
Patented Aug. 26, 1913.
13 SHEETS—SHEET 8.
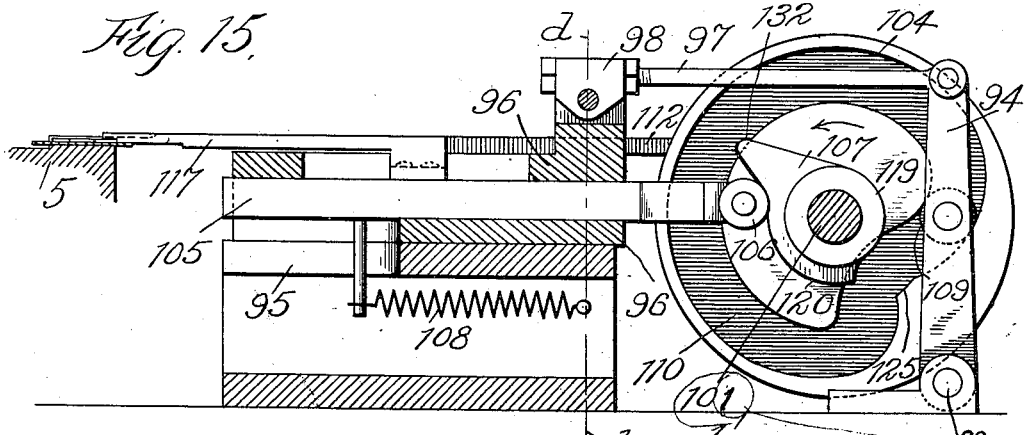
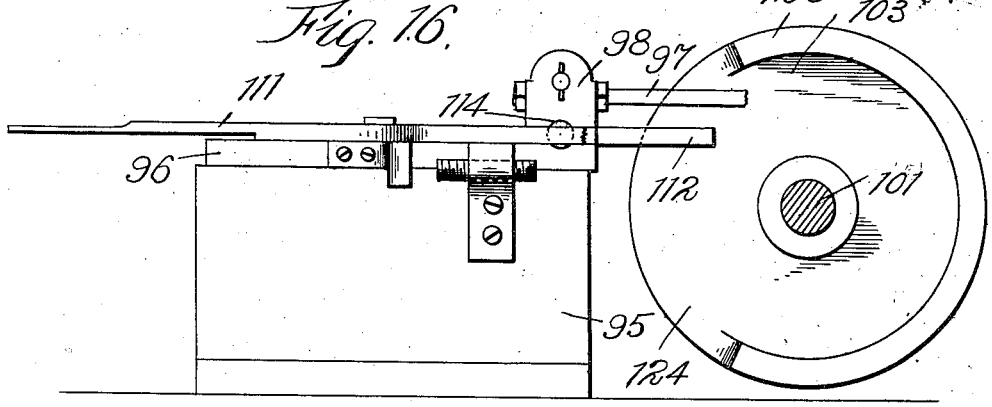
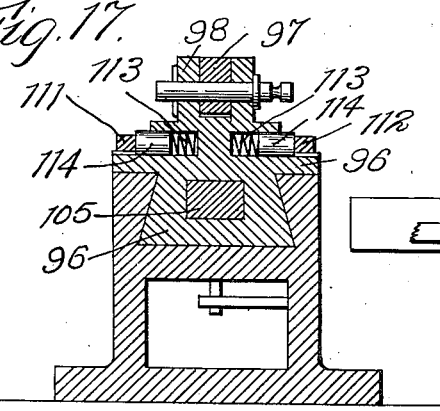
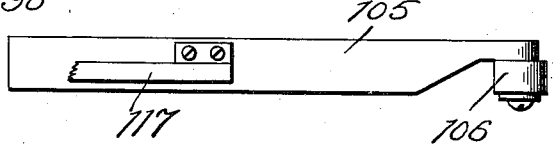

P. F. KLEINERT.
MACHINE FOR FASTENING HOOKS AND EYES ON CARDS.
APPLICATION FILED JUNE 27, 1907.
1,071,643.
Patented Aug. 26, 1913.
13 SHEETS—SHEET 9.
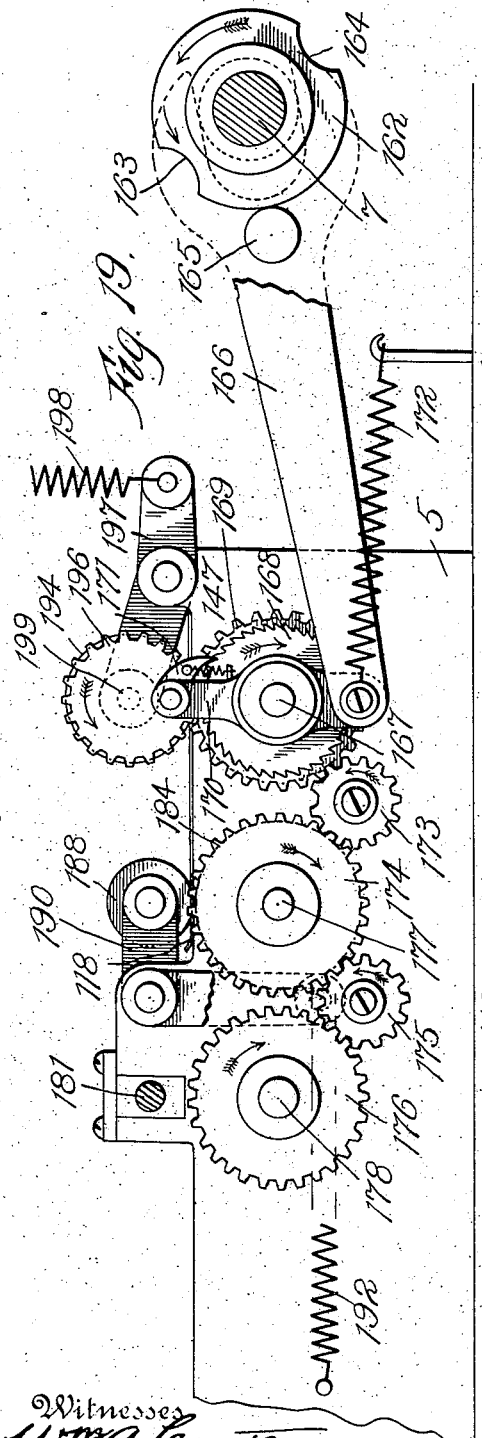
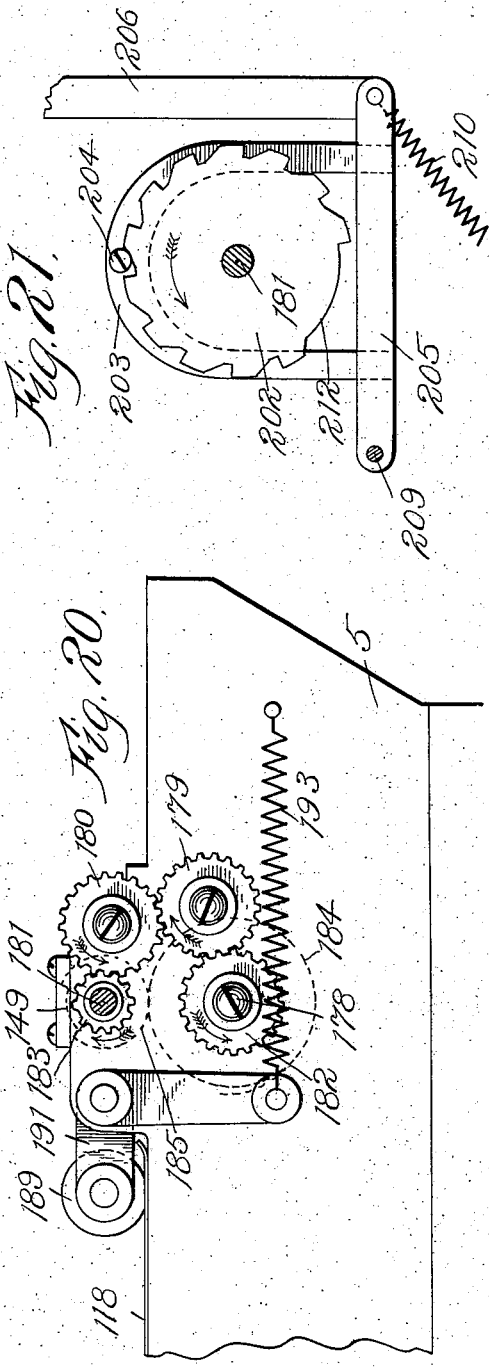

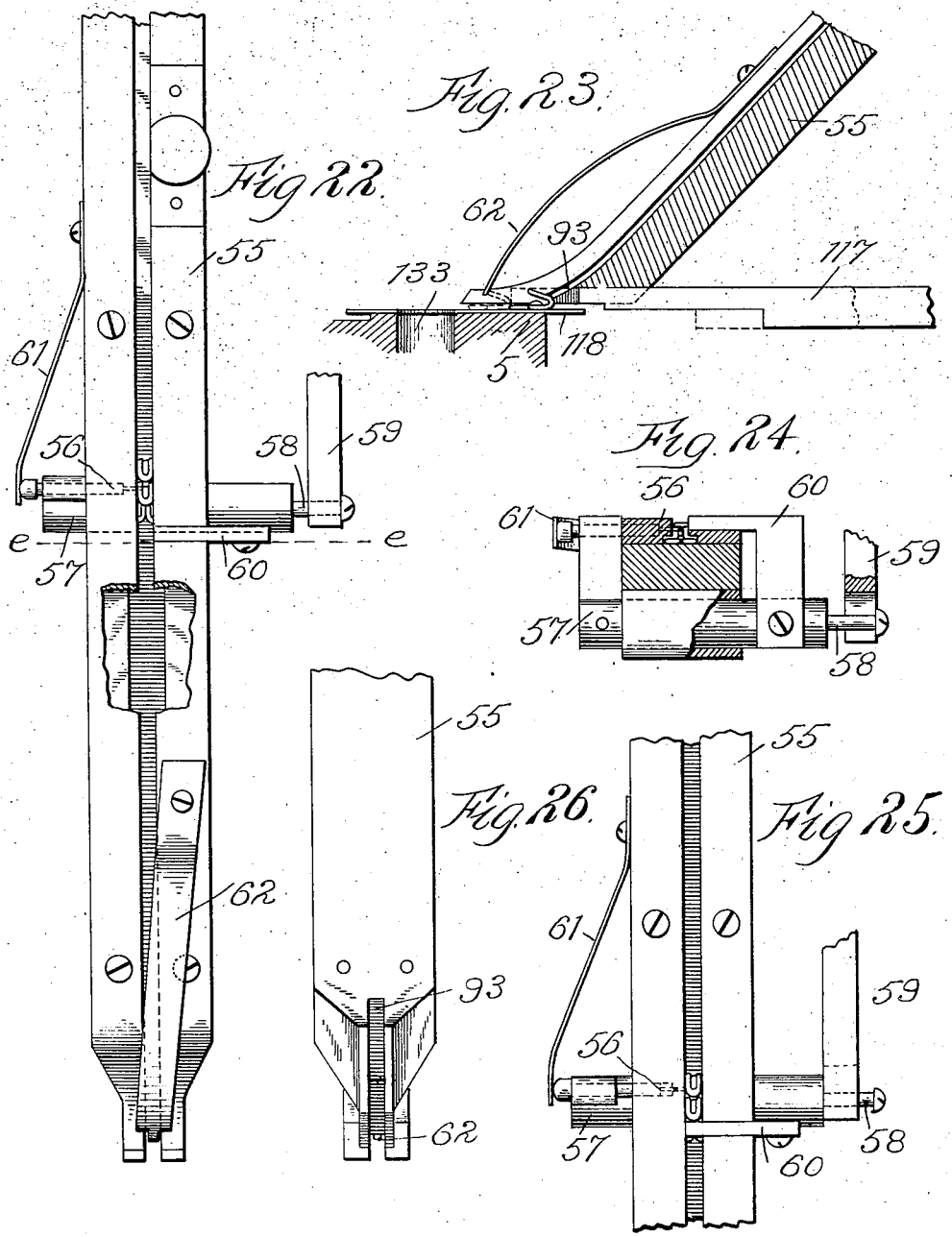

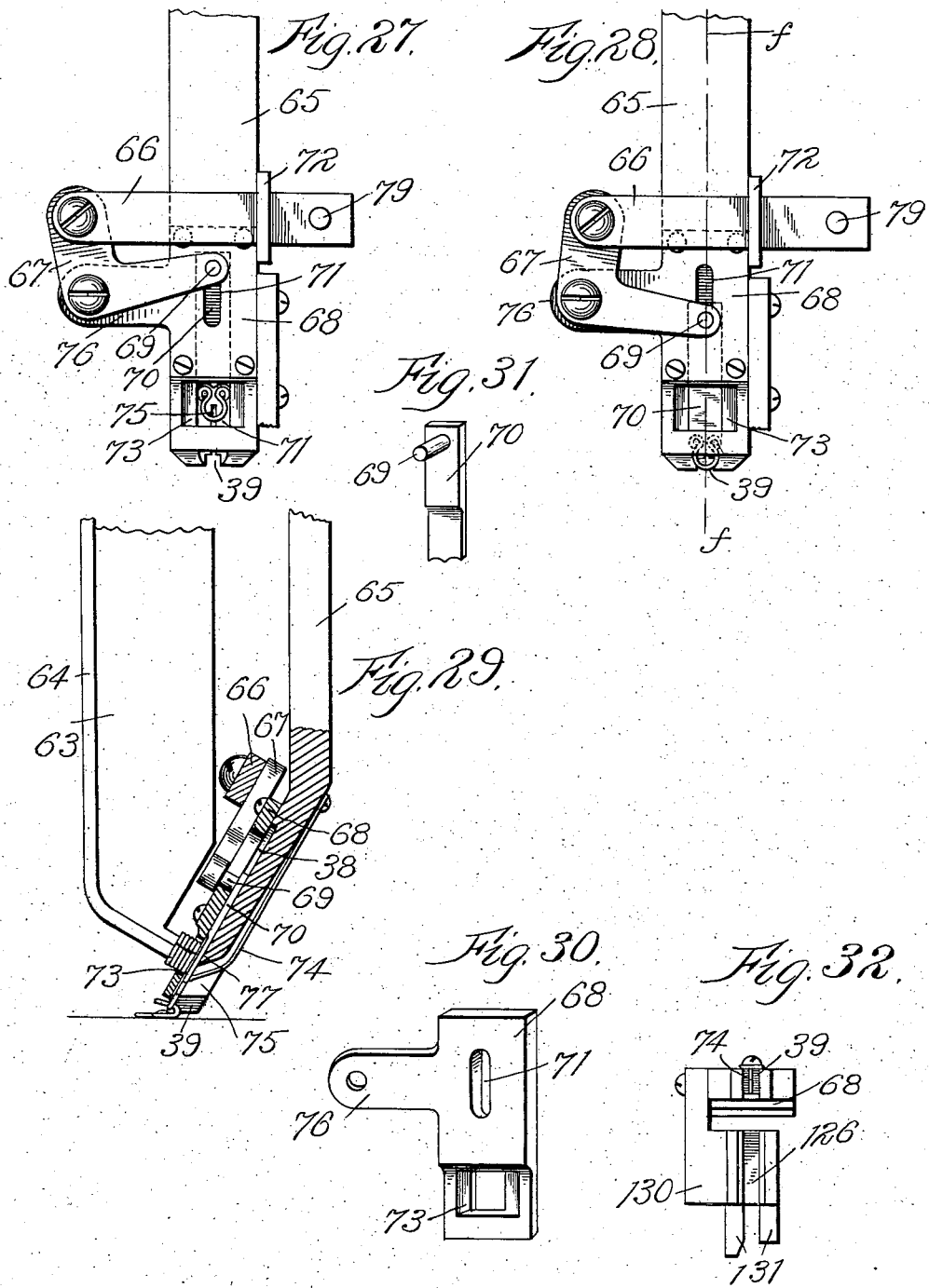

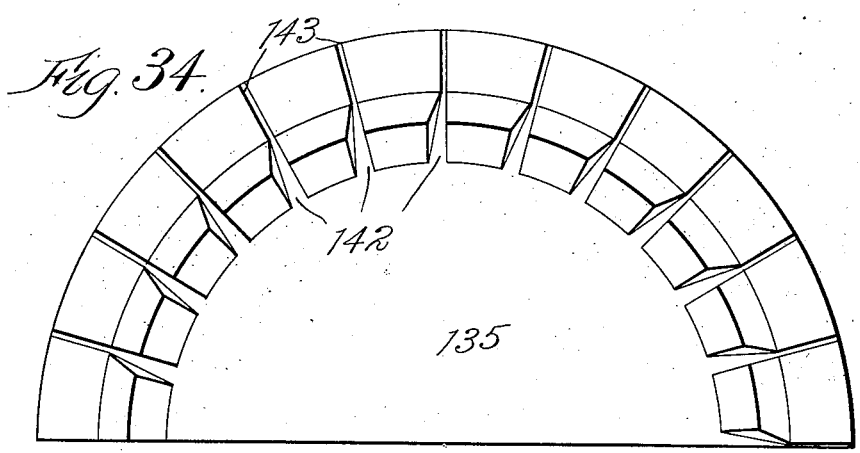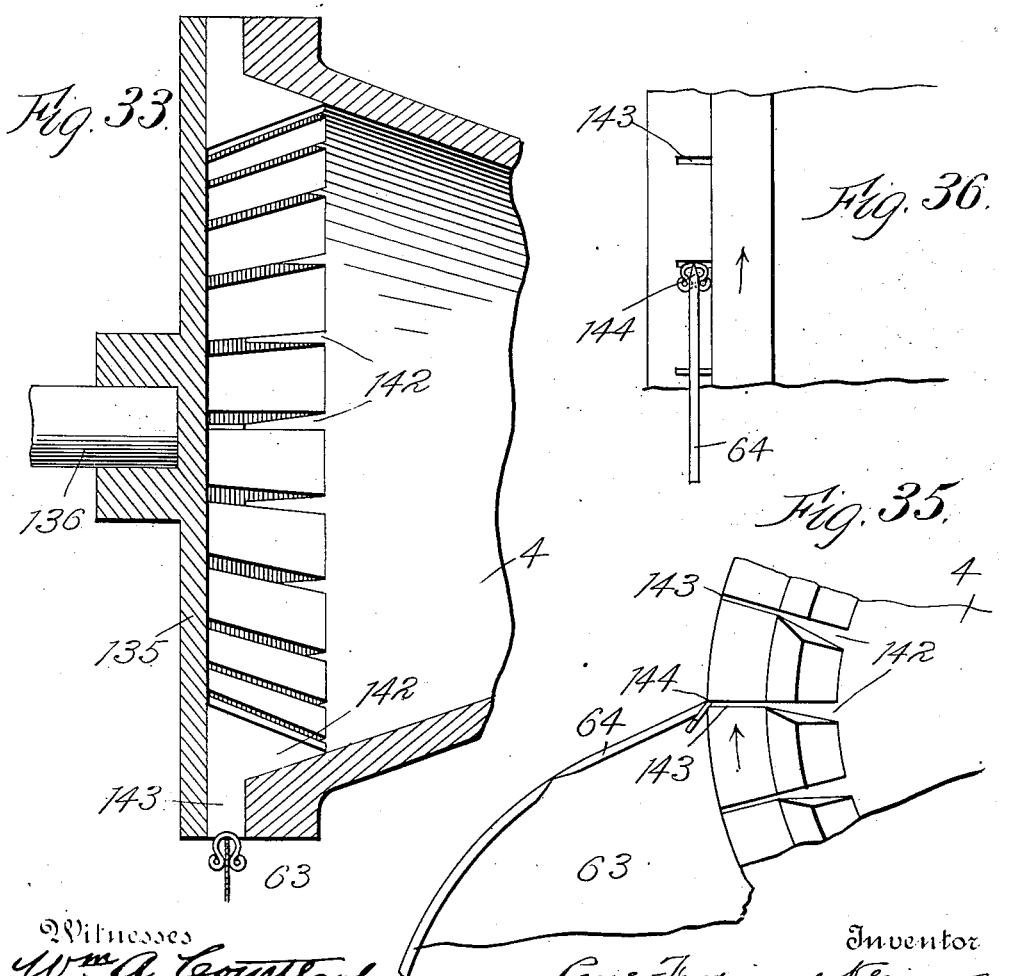

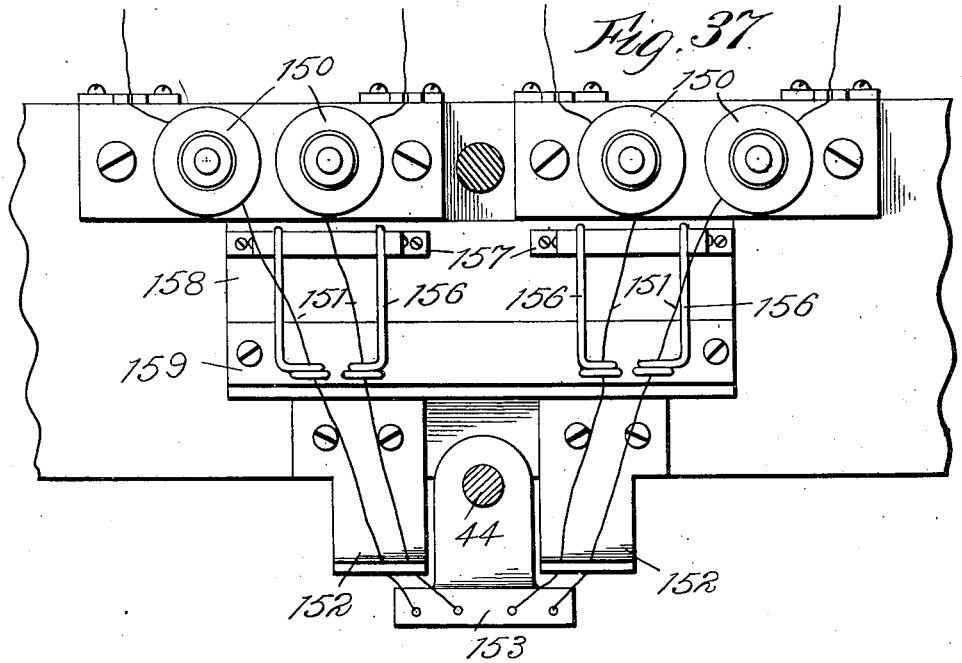
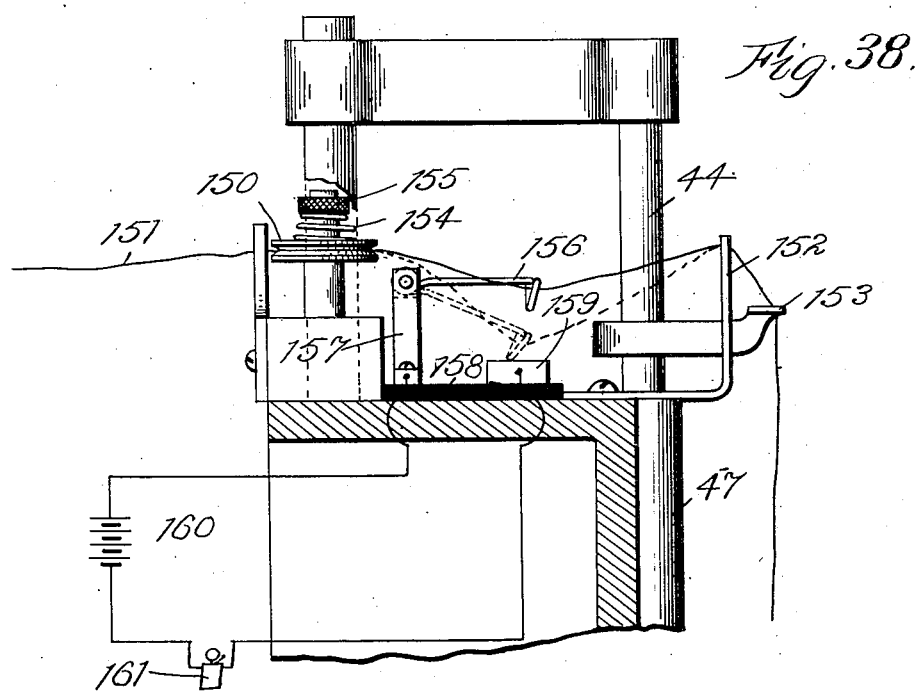

UNITED STATES PATENT OFFICE.

PAUL FERDINAND KLEINERT, OF WATERBURY, CONNECTICUT, ASSIGNOR, BY MESNE ASSIGNMENTS, TO THE CONNECTICUT HOOK & EYE COMPANY, OF WATERBURY, CONNECTICUT, A CORPORATION OF CONNECTICUT.

MACHINE FOR FASTENING HOOKS AND EYES ON CARDS.

1,071,643.     Specification of Letters Patent.     Patented Aug. 26, 1913.

Application filed June 27, 1907. Serial No. 381,088.

*To all whom it may concern:*

Be it known that I, PAUL FERDINAND KLEINERT, a citizen of the United States, and a resident of Waterbury, Connecticut, have invented certain new and useful Improvements in Machines for Fastening Hooks and Eyes on Cards, of which the following is a specification.

This invention relates to improvements in machines for fastening hooks and eyes on cards, the general type of machine being that described in Letters Patent, No. 710,517, issued to George Rowbottom on October 7th, 1902.

In particular my invention relates to improved construction and means of operation of the presser foot holding the hooks and eyes on the cards; to an improved hook and eye feeding mechanism which insures a more reliable working of the machine; to a simplified gripper mechanism; furthermore to an improved card feeding mechanism, to an improved form of the eye receptacle, and to means controlled by the sewing thread for indicating a break in same.

Figure 1:
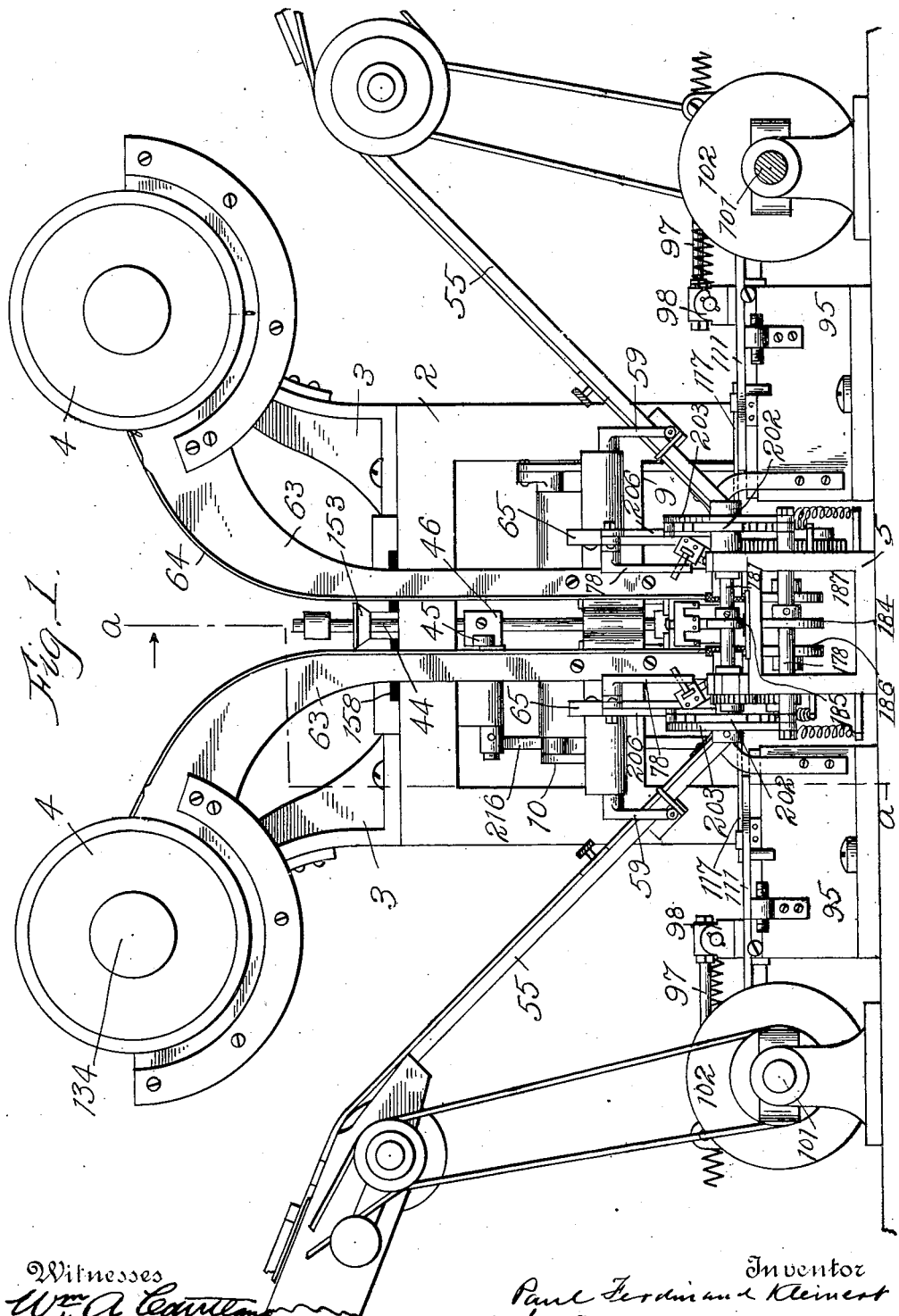
Figure 2:
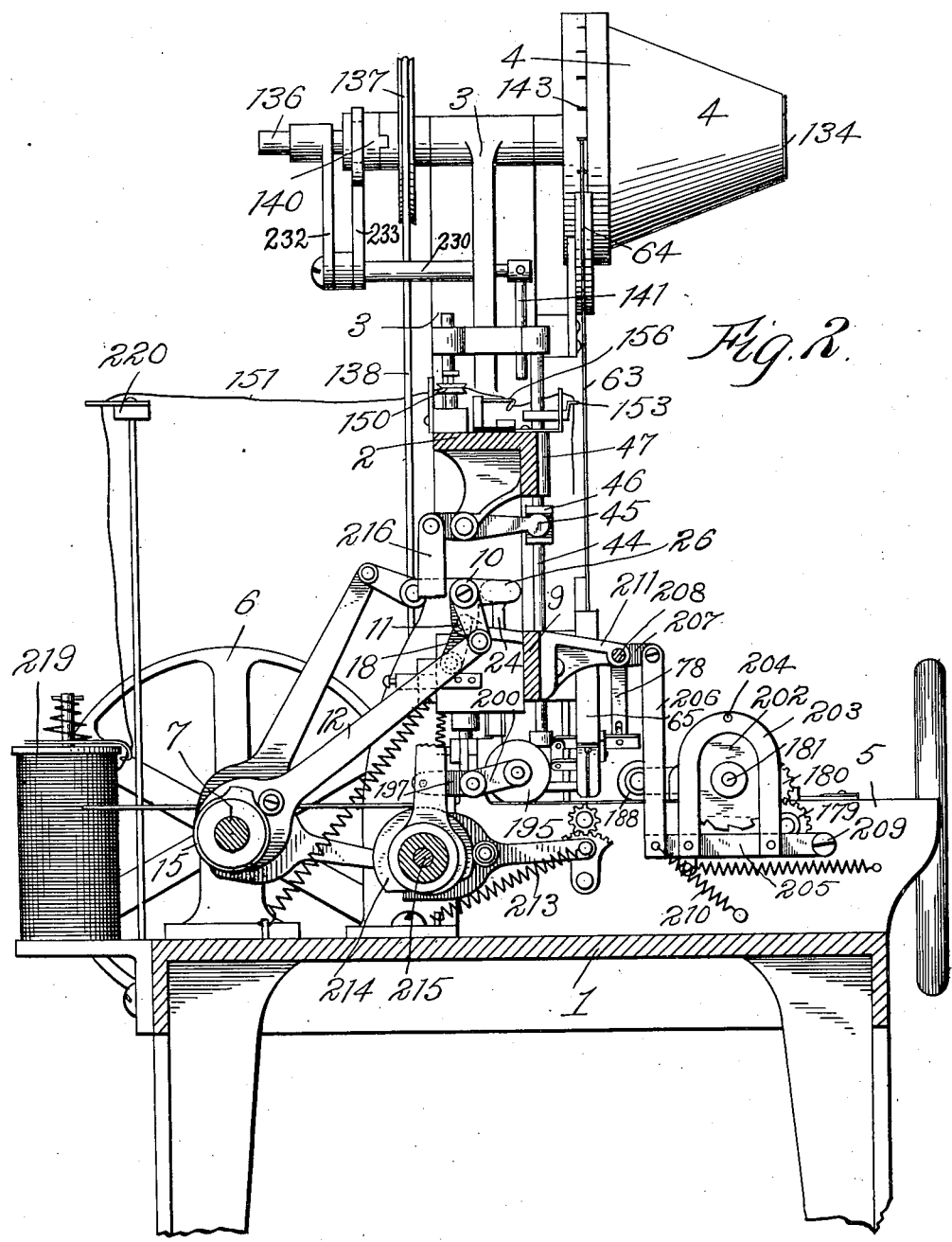
Figure 3:
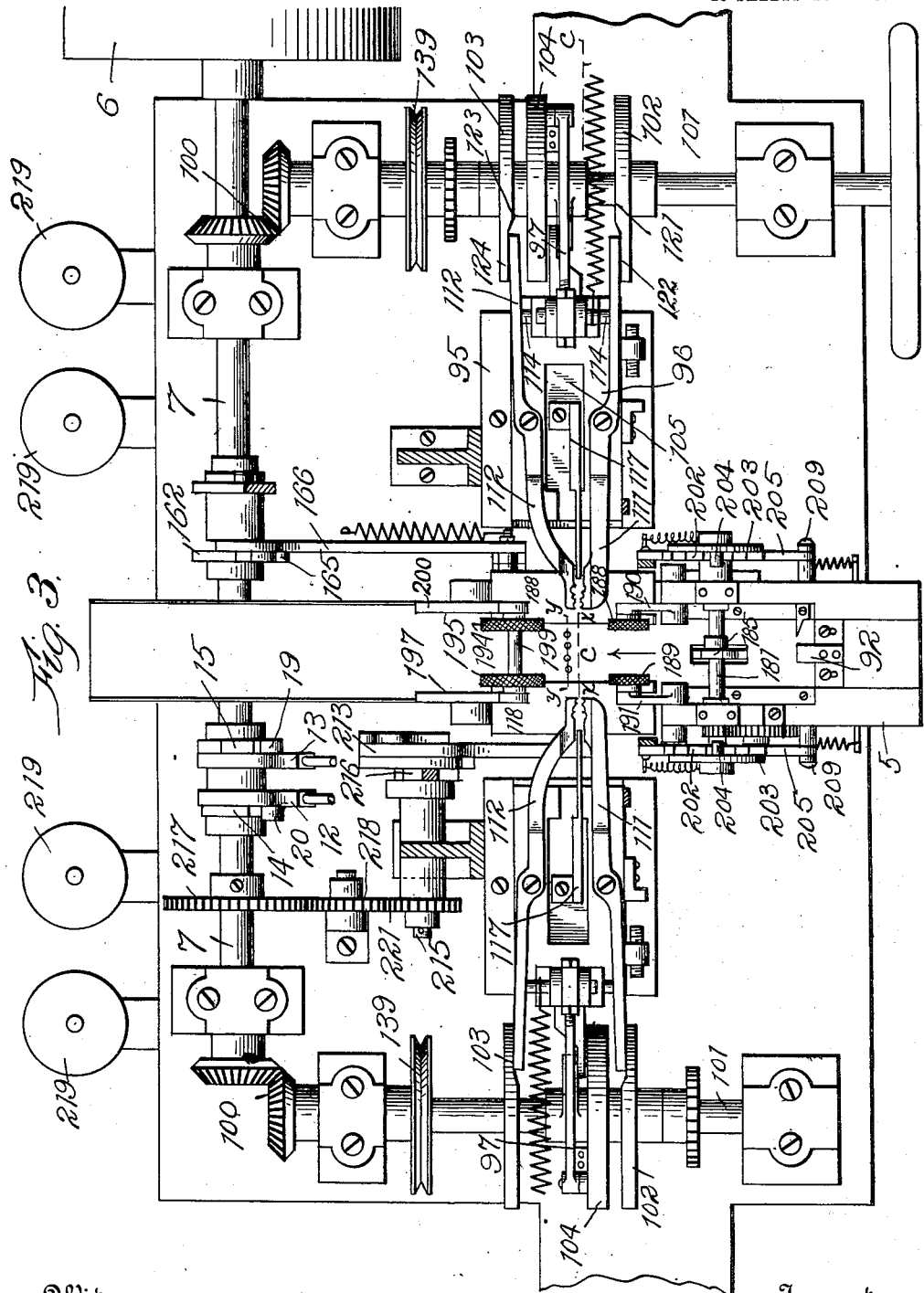
Figure 4:
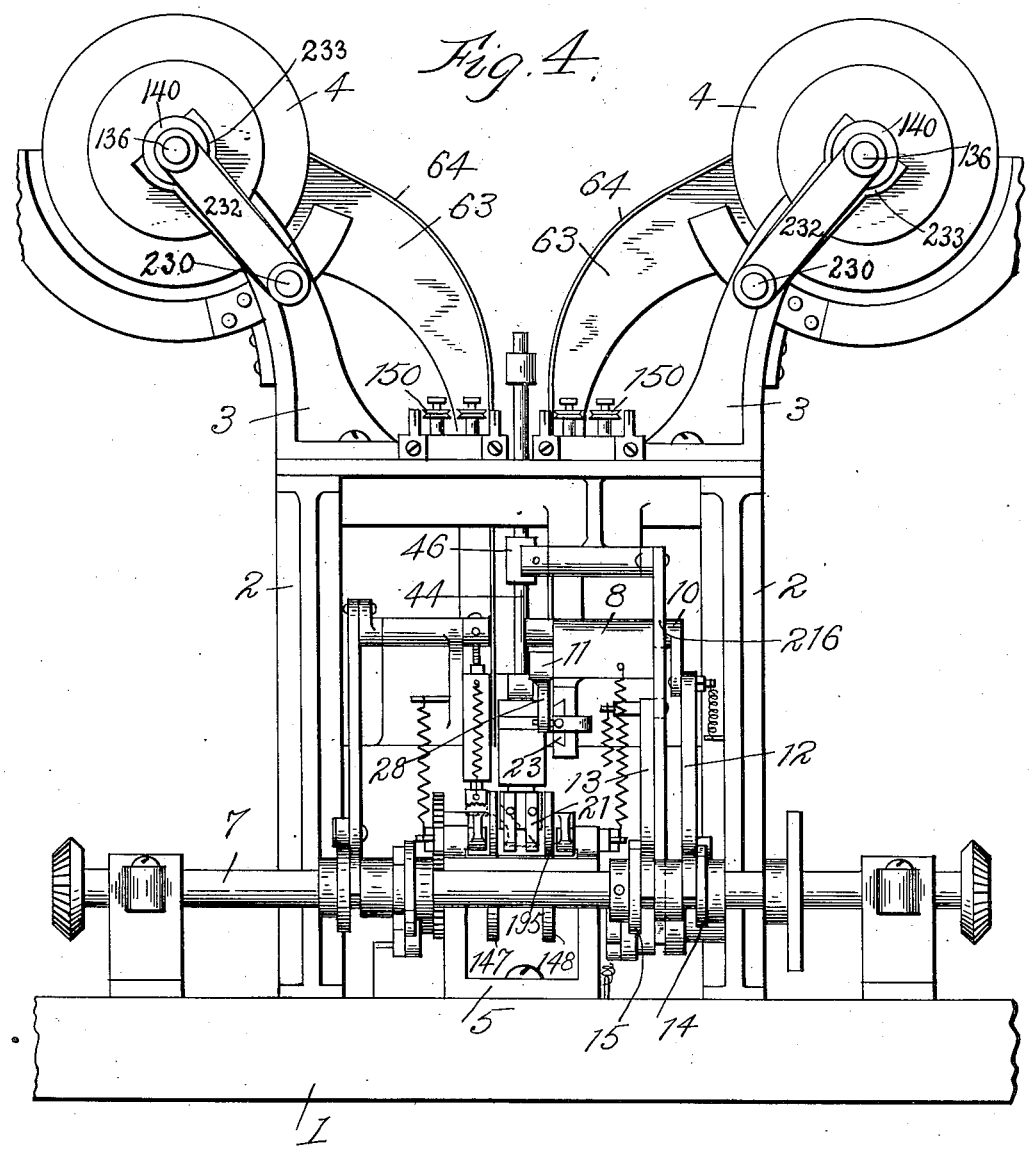

Referring to the drawings: Figure 1 is a front elevation of the complete machine with the exception of the hook hoppers. Fig. 2 is a transverse vertical section on the line *a—a* of Fig. 1 looking in the direction of the arrow. Fig. 3 is a plan view of the machine with the hook and eye feeding mechanism and the sewing mechanism removed. Fig. 4 is a rear view of the machine, the hook feeding mechanism being removed. Fig. 5 is a detail view of the mechanism controlling the movement of the hook and eye presser foot. Fig. 6 is a detail view of one of the forked arms controlling the vertical movement of the hook and eye presser foot. Fig. 7 is a plan view of the mechanism shown in Fig. 5. Fig. 8 is a vertical section through the end of the hook and eye presser foot showing the hook and eye in position to be sewed on the card. Fig. 9 is a bottom view of the same. Fig. 10 is a front elevation showing the hook and eye presser foot, the card presser foot and the needle carrying parts, the bed of the machine being shown in section on the stitch line. This view shows the position of the parts after the hook and eye have been delivered and the needle is about to descend, the hook and eye presser foot having moved back to the sewing position from the position of delivery by the gripper jaws. Fig. 11 is a sectional plan on the line *b—b* of Fig. 10 showing the needle carrying parts. Fig. 12 is a detail perspective view of the card clamping foot. Fig. 13 is a detail view in elevation showing the hook and eye feeding members and the hook and eye presser foot, card presser foot and needles in operative relation to each other at the end of the second stitch. Fig. 14 is a plan view of the gripper jaws. Fig. 15 is a vertical section on the line *c—c* of Fig. 3, showing the mechanism controlling the gripper jaws and pusher finger. This view shows the parts in position after the gripper jaws have closed on the hook and eye and are carrying them to a position on the card where they are seized by the presser foot. Fig. 16 is a side elevation of the parts shown in Fig. 15, but showing only one cam for opening and closing the gripper jaws. Fig. 17 is a transverse vertical section on line *d—d* of Fig. 15. Fig. 18 is a detail view of the cam controlling arm for operating the pusher finger. Fig. 19 is a detail view in elevation showing the card feeding mechanism. Fig. 20 is a detail view in elevation of a portion of the opposite side of the card feeding mechanism shown in Fig. 19. Fig. 21 is a detail view of the mechanism for intermittently operating the hook and eye feeding means. Fig. 22 is a plan view of the hook chute, the hook controlling means having just released a hook and allowed it to slide down to the bottom of the chute. Fig. 23 is a vertical section through a portion of the lower end of the hook chute and mechanism bed showing a hook after it has reached the bottom of the chute and about to be positioned by the pusher finger. Fig. 24 is a transverse vertical section of the hook chute on the line *e—e* of Fig. 22. Fig. 25 is a fragmentary detail view of a portion of the hook chute showing the hook retaining mechanism in normal position. Fig. 26 is a detail bottom view of the lower end of the hook chute. Fig. 27 is a detail view in elevation showing the means for feeding the eyes singly into position to be seized by the hook. Fig. 28 is a similar view to Fig. 27 showing the parts after they have moved the eye into position to be seized by the hook. Fig. 29 is a vertical section on the line f—f of Fig. 28. Figs. 30 and 31 are detail view of parts of the eye feeding mechanism. Fig. 32 is a bottom view of Fig. 29 showing the means for brushing the eye in the gripper jaws. Fig. 33 is a vertical section of the eye hopper. Fig. 34 is a face view of Fig. 33 with the hopper body removed. Fig. 35 is a fragmentary view showing how the eye is taken from the hopper by the eye rail. Fig. 36 is an edge view of the same. Fig. 37 is a plan view of the means employed to sound an alarm when the sewing threads break; and Fig. 38 is a side view of the same.

In the following specification, only the improved parts are described in detail, while all the other parts, comprising the machine, are only described as far as they are connected with said improvements, since they are or may be the same as in the patent above referred to.

In Figs. 1, 2, 3 and 4; 1 is the bed or frame on which the machine is mounted, and 2 is a vertical frame carrying on suitably shaped brackets 3 the eye hoppers 4. Longitudinally and centrally to the machine and transversely to frame 2 is mounted on bed 1 sewing table 5, within and on which the card feeding mechanism, to be described later on, is mounted.

6 is the main driving pulley by which power is applied to the machine, and 7 is the main shaft from which the motion is equally transmitted to both sides of the machine in a similar manner to that described in the patent above referred to.

Since both sides of the machine are symmetrical, each side sewing one row of hooks and eyes on the card, only one side will be described in the following: The presser foot mechanism for holding the pair of hooks and eyes in sewing position on the card after it has been delivered by the gripper is illustrated in Figs. 5, 6, 7, 8, 9, 10, 11, 12 and 13. In Figs. 5 and 7 are shown the rocking shafts 10 and 11 mounted in bracket 8 fastened on cross bar 9 of frame 2, and operated by forked arms 12 and 13, respectively, from roller cams 14 and 15 mounted on shaft 7. Presser foot 21, details of which are shown in Figs. 8 and 9, is mounted on bar 24 disposed in a slide 22 which in turn is a part of slide 23 mounted dovetailed in bracket 8 to reciprocate parallel to the line of movement of the cards. Bar 24 extending through slide 22 is provided with a slotted head 16 engaging pin 25 of arm 26 mounted on rocking shaft 10. Slide 23 engages by its pin 27 in arm 28 mounted on rock shaft 11, the rearward spring actuated motion of slide 23 being limited by set screw 29. By this mechanism it will be seen that foot 21 is enabled to perform a rectangular motion as follows: In the position shown in Figs. 5 and 7 incline 30 of cam 14 is just about to throw forked arm 12 forward, which through arm 17, shaft 10 and arm 26 will cause the lifting of bar 24, and thus the lifting of presser foot 21 from the sewing plate 5, in order to make room for the gripper, to be described later on, to place the next pair of hooks and eyes on the card. In the meantime cam surface 33 of cam 15 will have approached roller 19 of forked arm 13 and by throwing this arm forward will, by moving arm 18 on shaft 11 and arm 28, cause slide 23 and thus presser foot 21 to move to the left toward the direction from which the card is fed, that is to say in this instance, toward the front of the machine, the end of the presser foot being at the end of this motion above the place where the pair of hooks and eyes has been placed by the gripper. Soon afterward cam surface 30 of cam 14 will have passed roller 20 of forked arm 12 and this arm will be retracted by spring 31 until roller 20 rides on cam surface 32 which will cause presser foot 21 to descend and take hold of the pair of hooks and eyes presented by the gripper in a manner to be described later on. In the meantime cam surface 33 of cam 15 has passed roller 19, and forked arm 13 is retracted by spring 34 until roller 19 rides on cam surface 35, thereby moving slide 23 and with it presser foot 21 slightly to the right to convey the first pair of hooks and eyes from the line x—x in Fig. 3 on which they have been placed by the gripper to the sewing line y—y, it being understood that the card moves on sewing table 5 in Fig. 5 from the left to the right. The adjustment of presser foot 21 is so that when roller 20 rides on cam surface 32, presser foot 21 has indeed seized the pair of hooks and eyes, but has not pressed it down firmly on the card. The fixing of the hooks and eyes in sewing position takes place as soon as roller 20 leaves cam surface 32 and rides on cam surface 36 which causes bar 24 to descend farther and hold the pair of hooks and eyes firmly on the card until a stitch has been made by the machine through the first pair of sewing eyes, which are at that time in line with the needles. After the stitch has been made, roller 19 has reached the end of cam surface 35 and will ride now on surface 37, thereby causing slide 23 and presser foot 21 to move with the card one step farther to the right which is equal to the distance between two sewing eyes of each hook and eye, so that thus the other pair of sewing eyes are presented to the needles and the sewing of this pair of hooks and eyes may be completed. After the needles have been withdrawn from the card, cam surface 30 of cam 14 has arrived again at roller 20 of forked arm 12 and throws this arm forward, thus lifting presser foot 21 from the sewing table 5 making room again for the gripper to present the next pair of hooks and eyes and repeating the process as described above.

When the presser foot descends to seize a pair of hooks and eyes, the action takes place while the jaws are still holding the hook and eye, and the jaws then release the hook and eye to cause the engaging portion of the presser foot to maintain its positive hold. The part 41 of the presser foot engaging the hook is disposed to move independently of presser foot 21 in a vertical direction and is pressed yieldingly against the hook by a spring 42 shown in Figs. 5, 7 and 8.

It has been found that the needles 43, shown in detail in Fig. 10, when leaving the card, after the second stitch has been made, tend to lift the card from the table 5, since at that time presser foot 21 has left the pair of hooks and eyes to make room for the gripper. A card presser foot has been therefore provided which will press the card against the table while the stitch is made until the needles have been pulled out of the card. This device is shown in detail in Figs. 10, 11 and 12. Needle bar 44 slidingly mounted in guide 47 of cross bar 9 (Fig. 2) is operated by rocking lever 45 suitably fulcrumed in frame 2 and engaging in yoke 46 of needle bar 44. Rocking lever 45 in turn is operated from shaft 7 in a similar manner to that described and shown in the patent above referred to. In Fig. 10 are shown mounted on the needle bar guide 47 the guide plates 48 in which the rods 49 of card presser foot 50 are disposed to have vertical movement. These rods are further guided in brackets 51 mounted on needle bar cross arm 52. The card presser foot is pressed against table 5 by springs 53 abutting against brackets 48 on one end and on the other end against collars 54 fixed on rods 49. The adjustment of collars 54 is such that foot 50 is held against the card as long as the needles are in the stitch holes. Shortly after the needles have been withdrawn from the card, guide brackets 51 will strike in their upward motion together with needle bar 44 against collars 54 and thereby lift foot 50 from the card, which lifting motion occurs early enough not to interfere with the gripper, placing the next pair of hooks and eyes on the card.

The hook and eye chutes shown in Figs. 1, 2, 22, 23, 24, 25, 26, 27, 28, 29, 30, and 32, comprise principally similar parts to those shown in the patent above referred to, and the improvements consist in devices provided in these chutes for feeding a single hook and eye at a time to the gripper. After a hook has been delivered to the chute 55 in the manner described in the patent above referred to or otherwise, it slides down until it strikes pin 56 placed in the path of the hook and held in this position by spring 61. On the under side of chute 55 is suitably disposed slide 57 engaging pin 56 with a slight lost motion and also carrying on the side opposite to pin 56 locking bar 60 disposed on said slide 57, so that when pin 56 retains the hooks delivered to the chute, locking bar 60 is out of the path of the hooks in the chute. This position is shown in Fig. 22. If now by suitable means, to be described later on, slide 57 is shifted to the left, pin 56 will be taken along by the slide and thus release the hooks which will now move forward in the chute until the bill of the first hook strikes the locking bar 60, which has been moved in the meantime by slide 57 into the path of the hooks. This position is shown in Fig. 25. If now slide 57 is returned to the right, pin 56 will first return into its locking position by means of spring 61, thereby retaining the second hook. On further movement of slide 57 to the right, the first hook will be released from locking bar 60 and slide down to the end of the chute where it is held by leaf spring 62 ready to be taken by the gripper to be described later. While any number of hooks may have collected in the chute above pin 56, the feeding device above described will by its reciprocating motion feed only one hook at a time to the end of the chute.

The device for delivering the eye into position to be engaged by the bills of the hooks comprises the following mechanism. After the eyes have been delivered by the eye receptacle, to be described later on, to rail 63 (Fig. 4) and have straddled down along on the bead 64 of this rail in a similar manner to that shown in the patent above referred to, they will arrive finally at the end of the rail shown in detail in Fig. 29. As may be seen from this figure the end of the rail is suitably shaped to protrude into an opening 73 of the device delivering the eye singly into the path of the hook bills. In said device 65 is a bar which is suitably fastened on cross bar 9 of frame 2 and extends downwardly approaching the sewing table at a suitable angle shown in Figs. 13 and 29. The upper side of the end of bar 65 is provided with a recess 38 adapted to receive a slide 70 shown in perspective view in Fig. 31, and is furthermore provided at its end with a narrow slot 75 shown in Fig. 27 in plan view and in Fig. 29 in side view. The recess 38 which receives slide 70 is covered by plate 68, provided with a slot 71 through which a pin 69 fastened on slide 70 protrudes. Side arm 76 of plate 68 carries pivoted to it bell crank 67, one arm of which engages pin 69 of slide 70, while the other arm is pivoted to a slide 66, moving transversely to bar 65 in guide 72. At the lower end of plate 68 is provided the opening 73 of suitable size and shape to have the eyes pass through it when they are delivered by the eye rail 63 protruding into said opening as mentioned before. On the under side of the end of bar 65 is fastened a spring 74, the tip of which protrudes into the narrow slot 75 near the end of bar 65, so that when an eye glides from rail 63 through opening 73 of plate 68 and rests on the bottom 77 of recess 38 of bar 65, it will be prevented from further gliding down by said spring 74. In this position of the eye, slide 70 is drawn up to its highest position as indicated in Fig. 27. If now by suitable means to be described later, slide 66 is shifted to the right into a position indicated in Fig. 28, slide 70 will be shifted downward, thereby pushing the eye, which has been delivered by the rail in front of it, to the end of the feeding device which is suitably shaped to fit the eye and prevent it from falling out, as may be seen in Fig. 28. When in this position of the eye a hook is carried by the grippers from the right to the left (Fig. 29), its bill will pass through recess 39 provided at the end of bar 65, and engage the eye, and on further movement to the left lift same from its seat (shown in Figs. 28 and 29) and draw it out of the feeding device. On reverse motion of slide 70 another eye will drop down from the rail into recess 38 of the feeding device and be held there by spring 74 until slide 70 is operated downward to deliver another eye into engaging position for the next hook, and so on.

In the machine of the Rowbottom patent referred to, the hooks and eyes forming a pair have been delivered to the card by individual grippers, so that two grippers disposed within each other were used to place a pair of hooks and eyes on the card, which involved a rather complicated mechanism. My improved gripper mechanism, however, comprises only one gripper for each pair of hooks and eyes which has simplified this device considerably.

The gripper device (Figs. 1, 3, 13, 14, 15, 16, 17 and 18), comprises a support 95 suitably mounted on bed plate 1, which contains the slide 96 disposed in a dove-tailed groove and operated by the connecting rod 97 pivoted on lug 98 of slide 96 and pivoted at its other end to lever 94, fulcrumed at 99 on bed plate 1. The shaft 7 (Fig. 3) is connected by miter-gears 100 to shaft 101, which carries the gripper-operating disks 102, 103 and 104 shown in detail in Figs. 15 and 16. Within slide 96 is disposed another slide 105, a side view of which may be seen in Fig. 15. At the right end of this slide is fastened cam roller 106, riding on cam 107 mounted on shaft 101, slide 105 being held in engagement with cam 107 by spring 108. Lever 94 is provided with cam roller 109 which is disposed in cam groove 110 of disk 104, so that lever 94 will be positively operated at all times. On slide 96 are fulcrumed the two gripper arms 111 and 112, the ends of which are held in gliding engagement with disks 102 and 103, respectively by springs 113 and pins 114 (Fig. 17), disposed in recesses of slide 96. The jaws of gripper arms 111 and 112 are shaped at their ends 116 suitably to receive the sewing eyes of the hook and also the eye in a recess 115. On slide 105 which is disposed in slide 96 between the gripper arms, is mounted pusher 117, the different purposes of which are hereinafter set forth.

When as shown in Fig. 23 a hook has been delivered to the end of the chute, thereby striking leaf spring 62, which keeps the hook from prematurely slipping out of the chute, it has been found that the hook will slightly rebound on spring 62 and slide back on the surface of plate 118 of sewing table 5 into a position shown in this figure in full lines. This rebound would cause the hook not to be in the proper position to be seized by the gripper jaws at the sewing eyes. To insure the proper seizing position of the hook at the end of the chute (indicated in dotted lines in Fig. 23) is one of the purposes for which pusher 117 has been provided. When (see Fig. 15), roller 106 rides on cam surface 119 of cam 107, the slide 105 and with it pusher 117 are retracted the farthest to the right. When now, revolving in the direction of the arrow, cam 107 causes roller 106 to ride on its surface 120, pusher 117 will be moved slightly to the left far enough to push the hook shown in Fig. 23 in full lines into the position indicated in dotted lines, for which purpose a groove 93 is provided on the under side at the end of hook chute 55 (Fig. 26) of suitable size to have pusher 117 pass through it. In the meantime roller 109 of lever 94 is about to run up the incline of cam surface 110 as shown in Fig. 15. Disks 102, 103, 104 and cam 107 are mounted on shaft 101 relatively to their cam positions, so that just after roller 106 has come into contact with cam surface 120, thus causing pusher 117 to push a hook into sewing position, the gripper arms 111 and 112, previously in contact with the elevated portions 121 and 123 of disks 102 and 103 respectively, will come into contact with the respective recessed portions 122 and 124 of disks 102 and 103, owing to the expansion of springs 113 as above described. This causes the gripper jaws 116 to seize the hook, brought into proper position by pusher 117, at the sewing eyes. This relative position of the different parts of the gripper mechanism described above is indicated in Figs. 15 and 16. As already mentioned roller 109 is just about to roll up the incline of cam groove 110, which will cause slide 96 with its gripper arms and the seized hook to move forward until roller 109 arrives at cam surface 125, which causes the gripper jaws to come into the proper position to place the hook and eye on the card. During this forward movement of the seized hook the bill of the hook will engage in the eye, delivered by the eye feeding mechanism into the proper position as described above, and the eye, taken along by the hook, will drop into recess 115 of the jaws, (Fig. 14).

To insure the dropping of the eye into recess 115, which is desirable in order to place a pair of hooks and eyes into the proper position to be received by the eye presser foot, a brushing device is provided which brushes over the sewing eyes of the hooks and eyes, while they are shifted into sewing position in the following manner: On bar 65 is fastened block 130 (Fig. 13), the under side of which is suitably recessed at 126 (Fig. 32) to have the bill of the hook pass through it. At the end of block 130 is fastened brush 131, a forked plate spring, the two ends of which are bent to run in parallel to the sewing plate 5 so close that just enough space is left for the sewing eyes of the hook and eye to pass between these ends and plate 118, while the bill of the hook passes through the space between the two ends 131, which will cause any eye which has not properly dropped into recess 115 of the gripper jaws to be brushed into this recess.

While roller 109 is riding up to cam surface 125 as described above, roller 106 will ride on cam surface 132, which owing to its steep incline will throw slide 117 with a sudden impulse forward, following the forward movement of the gripper, whereafter the pusher will be withdrawn quickly by spring 108 before the gripper has started for its return motion. This forward motion of the pusher is necessary for the following reason: If from any cause the hook feeding mechanism should fail to deliver a hook at the proper time or the gripper should fail to seize the hook, the eye would remain at the end of the eye feed in its seat shown in Fig. 28. As the eye feed keeps on delivering another eye to the end of the eye feed, this next eye would not be able to push the first eye from its seat in Fig. 28, since the latter eye can only be removed by lifting it from its seat in the direction in which the hooks pass the eye feed, that is in Fig. 29 from the right to the left. If now as described above the pusher follows the gripper in its forward motion, it will strike an eye, accidentally remaining in its seat in the same direction a hook would strike it, lift it from its seat and cause it to drop into the hole 133 provided for this purpose in table 5, thus clearing the eye feed for the next eye to be delivered. After roller 106 has passed cam surface 132, it will ride again on cam surface 119, ready to perform another cycle of operations, while roller 109 will roll down from cam surface 125, thus withdrawing the gripper jaws from the sewing position of the hooks and eyes into the position to seize the next hook. Before the gripper is withdrawn from the position above referred to, gripper arms 111 and 112 will come again into contact with the elevated portions 121 and 123 of disks 102 and 103 respectively, which will cause the gripper jaws to open and to let go the pair of hooks and eyes placed on the card ready to be received by the presser foot as above described.

The card feeding mechanism which is shown in Figs. 1, 3, 4, 19 and 20 comprises the following parts: In Fig. 19, 5 is the sewing table on which and within which the card feeding mechanism is mounted. The card is placed on table 5, with its end flush with margin stop 92, to be received by pick up roll 185 (Fig. 3). Fig. 19 is a right side, and Fig. 20 a left side view of the card feed shown in Fig. 3. On main shaft 7 of the machine is mounted cam 162 provided with two recesses 163 and 164. Roller 165 of forked arm 166 is suitably disposed to roll on the surface of cam 162. The other end of forked arm 166 is linked to a rocking lever 170 loosely mounted on shaft 167 which is journaled in sewing table 5 and has fixed to it ratchet wheel 168 and spur wheel 169. To the other end of rocking lever 170 is pivoted pawl 171 engaging in ratchet wheel 168, so that when roller 165 has rolled into recess 163 or 164 by means of tension spring 172 attached to forked arm 166, pawl 171 will be moved one tooth back and move ratchet wheel 168 one tooth farther in the direction of the arrow when roller 165 rolls out of either recess 163 or 164, cam 162 revolving in the direction of the arrow. The rotation of ratchet wheel 168 and spur wheel 169 is transmitted by the idler 173 to spur wheel 174, mounted on shaft 177, and thence by the idler 175 to spur wheel 176, mounted on shaft 178. Shaft 178 carries on the other side of table 5 (shown in Fig. 20) spur wheel 182 in mesh with the idlers 179 and 180 which in turn are in mesh with spur wheel 183 fastened on shaft 181, the other end of which may be seen in Fig. 19. Inside of sewing table 5 is mounted on shaft 178 roller 184 (Fig. 1), and on shaft 181 roller 185 having part of its circumference recessed (Fig. 20 in dotted lines). The diameter of roller 185 is in the same proportion to that of roller 184, as the diameter of spur wheel 183 is to that of spur wheel 182. Both rollers are mounted close enough to each other that a card inserted between will be picked up after the recessed portion 149 of roll 185 has passed roll 184, and be conveyed by both rolls to the next rolls. On shaft 177 are mounted inside of sewing table 5 rolls 186 and 187 against which bear the upper feeding rolls 188 and 189 mounted in bell cranks 190 and 191, respectively, the rolls being held in their operative position by springs 192 and 193, respectively, attached to the other arms of said bell cranks. On shaft 167 are mounted inside of table 5 two lower feed rolls 147 and 148 (partly shown in Fig. 4) against which bear upper feed rolls 194 and 195, respectively, mounted on shaft 199 (Fig. 3) which is journaled in the two corresponding arms of bell cranks 197 and 200. Both of these bell cranks are suitably pivoted, one on each side of table 5 and hold upper feed rolls 194 and 195 in operative position by means of tension springs, one of which is shown in Fig. 19 at 198. Upper feed rolls 194 and 195 are positively driven by gear wheel 196 fastened at one end of shaft 199 and in mesh with gear wheel 168. The track of the cards is defined by plates 118 under which the cards slip when fed by the rolls 184 and 185 into the machine, their proper engagement under plates 118 being secured by having the end of these plates, which the cards approach first, slightly bent up (Fig. 19, left end), whereafter they are conveyed by the feed rolls above described through the machine in the direction indicated by the arrow in Fig. 3.

The step by step movement of the cards along their track in accord with the sewing process is obtained in the following manner: The whole machine is timed so that on one revolution of shaft 7 and shaft 101, one pair of hooks and eyes is placed by the gripper on the card. Since each hook and eye has two sewing eyes, two stitches have to be made by the machine for each pair of hooks and eyes, and consequently two feeding steps of the card feed are necessary for each pair of hooks and eyes. For this purpose recesses 163 and 164 are provided in cam 162 exactly opposite to each other, so that when shaft 7 makes one half revolution, rocking lever 170 connected with forked arm 166 will move ratchet wheel 168 one tooth, which step is through the transmission by means of the gear wheels 169, 174 and 176 to their respective feed rolls equal to the distance between two sewing eyes of the hook and eye.

On both ends of shaft 181 (Figs. 1, 2 and 3), are fastened toothed wheels 202, a detail view of which is shown in Fig. 21. Near and in parallel with toothed wheel 202 is disposed the yoke 203 which is a part of lever 205 fulcrumed at 209 on sewing table 5. On yoke 203 is provided screw 204 of suitable size to engage in the notches of toothed wheel 202, when lever 205 is drawn downward by tension spring 210. To the free end of lever 205 is pivoted bar 206 which in turn is pivoted at its upper end to arm 207 in Figs. 2 and 13. Arm 207 is fastened on shaft 208 journaled in bracket 211 fixed to cross bar 9 of frame 2. At one end of shaft 208 is further fastened arm 78 engaging with its slotted free end pin 79 of slide 66 of the eye feed described before, while at the other end of shaft 208 is fixed arm 59 engaging with its slotted free end pin 58 of slide 57 of the hook feed also described before. It will now be seen that if toothed wheel 202 revolves with shaft 181 in the direction indicated by the arrow in Fig. 21, yoke 203 and its lever 205 will perform a rocking motion, owing to screw 204 dropping into the different notches of toothed wheel 202 which rocking motion is transmitted by bar 206 to shaft 208 and arms 78 and 59 (Fig. 13). This will cause the slide 66 to operate the eye feeding device, and slide 57 to operate the hook feeding device, the timing of both devices being such that at the same time when an eye is fed to the end of the eye feeding apparatus, a hook is fed to the end of the hook chute into the proper position to be received by the gripper.

It has been stated above that the forward motion of one tooth of ratchet wheel 168 (Fig. 19), corresponds with one feeding step of the card and it has been also stated that two feeding steps of the card are necessary for one pair of hooks and eyes. The gearing from ratchet wheel 168 to shaft 181 through gear wheels 169, 174, 176, 182 and 183 is chosen so that when ratchet wheel 168 has been moved forward by its pawl 171, two teeth, toothed wheel 202 on shaft 181 has moved one tooth in the direction of the arrow, so that rocking members 205 and 206 operating the hook and eye feed described above, have completed one full up and down stroke. The result of this is that one single hook and eye has been fed by the hook and eye feeding devices into position to be placed by the gripper on the card. Since in this machine twelve pairs of hooks and eyes are to be sewed in one row on one side of the card, toothed wheel 202 is provided with twelve teeth.

After one row of hooks and eyes has been sewed to the card, two closing stitches have to be made by the machine into the card, and furthermore two other stitches have to be made at the beginning of the next card to properly fasten the thread in the card. The four feeding steps of the card feeding mechanism necessary for these idle stitches have to be made without operating the hook and eye feed. Since now four feeding motions of the card feed correspond with the feeding of two pairs of hooks and eyes of one row, I provide on toothed wheel 202 (Fig. 21) a notch 212 equal in its size to the space which two teeth occupy on the circumference of wheel 202, so that while screw 204 passes through notch 212, the hook and eye feeding devices will remain at rest, while the card feed moves the card four steps for the four idle stitches mentioned above. The recessed portion 149 of pick up roll 185 is placed so, relatively to notch 212 of wheel 202, that it will pick up the cards placed on the table, so that two idle stitches are made at the end of one card and two at the beginning of the following card.

The sewing mechanism as far as it comprises the loopers mounted within sewing table 5 are not shown in the drawings, since none of my improvements relates to these parts of the machine. The looper mechanism which may be of any kind is operated by forked arm 213, suitably operated by cam 214 mounted on shaft 215 which also operates arm 216, imparting rocking motion to lever 45 in engagement with the needle bar 44 as described above, (Fig. 2). Rotating motion is transmitted to shaft 215 from the main shaft 7 (Fig. 3) through the gear wheels 217 mounted on shaft 7 and idler 218 and pinion 221 mounted on shaft 215.

The eye hopper is shown in detail in Figs. 33 to 36 and its location in the machine in Figs. 1, 2 and 4. The hopper has a conical shape with an opening 134 at the tapered end, as may be seen in Figs. 1 and 2, through which it is charged. The other end of the hopper is closed by a cover 135, the particular features of which are to be described later on. Cover 135 is fastened centrally to shaft 136 which is journaled in bracket 3 mounted on frame 2 as before mentioned. Shaft 136 is driven by pulley 137 through belt 138 running over pulley 139 fastened on shaft 101 (Fig. 3). If desired the hopper may be thrown out of operation by disengaging the clutch connecting its shaft 136 with pulley 137. For this reason shaft 136 (Fig. 2) is protruding on the left hand end beyond pulley 137 which is loosely fitted on this shaft. To this end of shaft 137 is splined collar 140 suitably shaped at the end facing pulley 137 to engage the hub of this pulley, which hub is correspondingly shaped for this purpose. Collar 140 is shifted on shaft 136 by means of forked arm 233 engaging it with its forked end and fastened to shaft 230 at its other end. Shaft 230 is suitably journaled in bracket 3 to have axial motion and guided by arm 232 loosely fitted on shaft 136. On operating shaft 230 by means of hand lever 141, shaft 136 may be thus thrown into and out of engagement with pulley 137.

When the hopper has been charged, the eyes will drop during its rotation into beveled slots 142 of cover 135, the particular shape of which is shown in detail in Figs. 33 to 35. On approaching the outer diameter of cover 135 the slots are contracted and assume a rectangular cross-section as shown at 143 (Fig. 36). If now an eye drops into one of these slots it will fall down into the contracted portion 143 of the slot and would commence to fall out of the hopper when the slots arrive beneath the axis of rotation of the hopper, if rail 63 were not provided which surrounds the lower half of cover 135 in the middle line of slots 143 as close as mechanical reasons will allow, as may be seen in Figs. 2, 4, 33 and partly in Figs. 35 and 36.

Rail 63 is thin enough to pass freely between the sewing eyes of the eye so that if one of the eyes tends to fall through one of the slots 143 with the sewing eyes first, this eye will ride on rail 63 as shown in Fig. 33. As may be seen in this figure the eye will not drop out of slot 143 entirely owing to the close position of rail 63 to cover 135, but will be carried along rail 63 by the edges of the slot 143 until it arrives at the bead 64 of rail 63 which is suitably shaped at the end 144 to cause the lower edge of slot 143 carrying the eye, to slip same over the bead as may be seen in Figs. 35 and 36, whereafter the eye will drop entirely out of slot 143, ride on bead 64 and straddle down to the eye feeding device described before. It will be seen without further discussion that no eye is thus able to drop out of the hopper unless it is in the proper position to be received by the rail, that is with the sewing eyes first. Any eye having another position in slot 143 cannot ride on rail 63 and will be simply carried along in its slot, until it drops back into the hopper as soon as its slot arrives at the upper half of disk 135.

While I have shown in the drawings rail 63 where it surrounds the hopper of equal thickness throughout so it may receive an eye from the slots with the sewing eyes first at any point, I do not wish to limit the scope of this invention to this particular structure. The spirit of this particular invention as claimed later on is, that suitable means are provided close to the hopper at places where an eye may drop out of the slots, and that these means owing to their structure may also normally prevent the dropping of the eyes out of their slots entirely even if in proper position, and that only at most suitable places these means may be of such shapes as to allow the dropping out of the eyes only in a predetermined position and to receive same in such position. The structure of these means, as shown in the drawings, is merely a specific form in which the articles may drop out of their slots in their predetermined position at any point of the means surrounding the slots.

It occasionally happens that a stitch is skipped or that the sewing thread breaks, which when unnoticed by the operator will result in the hooks and eyes being imperfectly fastened or not fastened at all. In order to notify the operator of such a break before the broken end of the thread has reached the needle, or of the skipping of a stitch, the following device has been provided: On top of frame 2 in Fig. 4 friction rollers 150 are suitably mounted (shown in detail in Figs. 37 and 38), around which the threads 151 are wound before they are led over the thread guides 152 and 153 down to the needles, in order to give the thread the necessary tension. As may be seen in Fig. 38, these friction rollers 150 may be adjusted by spring 154 and nut 155. Between roller 150 and thread guide 152 each thread 151 is led through the eye of a hook shaped arm 156 pivoted in brackets 157 which are insulated from the machine frame by plate 158. Under normal conditions each thread will hold its arm 156 in the position indicated in full lines in Fig. 38. Underneath the eye-shaped ends of the arms 156 is disposed plate 159 also on insulating plate 158. Brackets 157 and plate 159 are each connected to one of the terminals of an electric circuit comprising a battery 160 and any electrically operated mechanism of any suitable kind adapted to call the operator's attention to the abnormal condition of the thread, that is, to indicate a break or slack in one of the threads. I have indicated simply by way of example the electric bell 161. In case one of the threads should break or skip a stitch, (the latter event giving enough slack thread to perform the operation), the arm 156 having a substantial weight will fall down and close the circuit by touching plate 159, indicated in Fig. 38 in dotted lines, thus causing said electrically operated mechanism to act, for example causing the alarm 161 to sound and call the operator's attention to the break or skipped stitch. The sewing thread runs from the spool 219 suitably mounted on bed plate 1 over the guide 220 to the tension rolls 150 and thence to the sewing needles in the manner above described.

It will be noticed, that the hook as shown in the drawings, for instance in Fig. 29, has not its normal form, that is, the bill is not in parallel to the body, but has the bill slightly bent upward. This form of the hook facilitates the engagement of the eye to a great extent, particularly in case of hump back hooks as shown in the drawings, in which special means would have to be provided to pull the eye past the hump if the hook had its normal form, that is the bill in parallel to the body. In the machine described above the hooks are brought into their normal shape after the sewing process by means, provided for this purpose, which are slightly indicated in the drawings. Since this device is not my invention, no reference has been made to it in the specification.

The manner in which the machine operates is as follows: The eyes delivered by the hopper 4 to rail 63 ride down on bead 64 collecting in any number on top of each other at the end of rail 63, as described above and shown in Fig. 29. The hooks are delivered to hook chute 55 with the sewing eyes first, which is not shown in the drawings as it may take place in the same manner as in the patent above referred to, whereafter they may gather in any number at the single feed device described above where they are stopped by the pin 56 of this device, shown in Fig. 22. After a card has been placed on to the sewing table at margin stop 92 (Fig. 3) and been picked up by pick up roll 185 at the proper time, determined by its recessed portion 149 as described above, it is brought by feeding rolls 188 into a position to receive the first pair of hooks and eyes. During this feeding motion, toothed wheel 202 operating the hook and eye feed has moved one tooth farther and caused one hook and one eye to be delivered into position to be seized by the gripper and conveyed on to the card. During this time roller 106 of slide 105 has passed cam surface 119 and will as soon as a hook has been delivered to the end of chute 165 roll on to the cam surface 120 (Fig. 15), which causes the pusher to place the hook into a position indicated in dotted lines in Fig. 23 ready to be seized by the gripper. During the period described above roller 109 of lever 94 has been rolling in the part of cam groove 110 concentrically with shaft 101, in which position the gripper jaws are ready to seize a hook at the end of chute 55 with its bill in contact with leaf spring 62. The free ends of arms 111 and 112 gliding on disks 102 and 103 respectively, have been in contact during this time with the elevated portions 121 and 123 respectively of these disks, which causes the jaws of the gripper to remain open. As soon as pusher 117 has performed the first pushing motion by means of cam surface 120 described above, the ends of gripper arms 111 and 112 glide down on to the recessed portions 122 and 124 of disks 102 and 103 respectively, causing the gripper jaws to close and seize the hook brought into the proper position by pusher 117. Roller 109 commences now to roll up the incline of cam groove 110, until it has reached the highest part 125. This has brought the gripper forward, during which motion the hook has engaged an eye delivered by the eye feed to the end of bar 65, and brush 131 has brushed same properly into recess 115 of the gripper. During the period in which roller 109 rolls up to and rides on surface 130

125, roll 106 rolls up on cam surface 132 which throws the pusher 117 forward with a quick impulse, withdrawing it as quickly before the gripper returns owing to the shape of cam surface 132. This pushing action removes any eye from the end of bar 5 which may not have been engaged by the hook and causes it to drop into hole 133 of sewing table 5. When roll 109 has arrived at the end of cam portion 125 the ends of gripper arms 111 and 112 come again into contact with the elevated portions 121 and 123 of their respective disks 102 and 103 which will cause the gripper jaws to open and let go the pair of hooks and eyes placed on the card. Roll 109 rolling now off the end of surface 125 will cause the gripper to withdraw quickly from the card and return to the position described at the beginning. At the moment the gripper jaws open, the presser foot 21 comes into action, descends partly receiving thereby the hook and eye by means of cam roll 20 of forked arm 12, rolling from cam surface 30 to cam surface 32 (Fig. 6). When roller 20 has arrived on cam surface 32, roller 19 of forked arm 30 has descended from cam surface 33 to cam surface 35 (Fig. 5) which causes the presser foot 21 to carry the pair of hooks and eyes from the line $x$—$x$ (Fig. 3) on which they have been placed by the gripper into the sewing line $y$—$y$. In the meantime roll 20 leaves cam surface 32 to roll on surface 36 which causes the presser foot to fully descend and press the pairs of hooks and eyes firmly on the card in a position in which the first sewing eyes of the hook and eye are in line with their respective needles. During the time, the above described hook and eye feeding motions are performed by the machine, the card picked up by pick up roll 185 has been fed forward and two idle stitches have been made by the machine into the card. If the needles now descend again to perform the next stitch they will fasten the first sewing eyes of the hook and eye on the card. Before the needles touch the card to make any stitch, card presser foot 50 (Fig. 10) has descended on to the card and keeps it pressed firmly against the sewing table by means of its spring 53, while the needles are in the card. Only after the needles have been fully withdrawn from the card will presser foot 50 be lifted from the table by guide bushings 57 of the needle bar cross arm, abutting against collars 54 fastened on rods 49 of the card presser foot. After the needles have left the card, rocking lever 170 (Fig. 19) of the card feed, moves by means of its pawl 171 ratchet wheel 168 one tooth in the direction of the arrow, which causes the card feed mechanism to feed the card forward the distance of the sewing eyes of the hook and eye, so that now the other sewing eyes of the pair of hooks and eyes are each in line with its needle. The presser foot 21 follows this motion of the card at the same time by means of roller 19 of forked arm 13 (Fig. 5), descending from cam surface 35 to cam surface 37 which causes slide 23 to move in the direction of the card feed. The needles now perform the second stitch which completes the fastening of the pair of hooks and eyes on the card. On withdrawal of the needles, presser foot 21 rises quickly, owing to roller 20 rolling up to cam surface 30, while the gripper places another pair of hooks and eyes on the card, so that the needles on descending again will stitch through the first sewing eyes of this second pair of hooks and eyes which has been brought by the presser foot 21 into the sewing line in the manner described above. These hook and eye feeding operations of the machine continue until the twelfth pair of hooks and eyes has been sewed on the card, whereafter screw 204 of toothed wheel 202 (Fig. 21) has passed the twelfth tooth and drops into the large notch 212 of toothed wheel 202, which stops the feeding of hooks and eyes, as long as screw 204 remains in this notch. During this time the feeding motion of the card continues and the needles fasten two idle stitches into the end of the card and two idle stitches into the beginning of the next card, which in the meantime has been picked up by pick up roll 185 at the proper time to be in the sewing line, when the needles descend for the two idle stitches, whereafter the screw 204 is lifted out of notch 212 by the first tooth at the end of the notch and the hook and eye feeding devices brought again into action, and the next card is sewed, and so on.

While I have shown in the drawings a specific form of such a machine, I do not wish to limit my invention to this form and particular purpose, as the features and combinations disclosed therein may be used for feeding, conveying or fastening various other articles, without departing from the spirit of the invention.

I claim:

1. In a machine for fastening hooks and eyes on cards, the combination with means for conveying to and placing a hook and eye in engaged position on the card, means for feeding said card step by step and means for attaching said hook and eye to the card; of means adapted to receive said hook and eye from said conveying means and means independent of the card feeding means for causing said hook and eye receiving means to shift the hook and eye from the receiving position into and hold same in attaching position on the card, and follow the feeding motion of said card feed during the attaching process.

2. In a machine for fastening hooks and eyes on cards, the combination of means for conveying a hook and eye to a card, means for sewing the hook and eye on the card, card feeding means, means for holding the hook and eye against the card and means for first shifting the hook and eye from the point where they are received upon the card to the first sewing position, and then shifting them with the card to the second sewing position.

3. In a machine for fastening hooks and eyes on cards, the combination of means for conveying a hook and eye to a card, means for sewing the hook and eye on the cards, card feeding means, means for seizing the hook and eye and conveying them, independent of the card feed, to the first sewing position and means for then clamping the hook and eye on the card and feeding them with said feed.

4. In a machine for fastening hooks and eyes on cards, the combination with a carrier adapted by its movement to place a hook and eye in engaged position on the card, means for feeding the said card step by step, and means for sewing said hook and eye on the card; of a hook and eye presser foot adapted to receive said hook and eye from said carrier, and means independent of the card feeding means for causing said presser foot to shift the hook and eye from the receiving position into and hold same in sewing position on the card, and follow the feeding motion of said card feed during the sewing process.

5. In a machine for fastening hooks and eyes on cards, the combination with a carrier adapted by its movement to place a hook and eye in engaged position on the card, means for feeding said card step by step, and means for sewing said hook and eye on the card; of a hook and eye presser foot adapted to receive said hook and eye from said carrier and to hold the hook yieldingly, and means independent of the card feeding means for causing said presser foot to shift the hook and eye from the receiving position into and hold same in sewing position on the card and to follow the feeding motion of said card feed during the sewing process.

6. In a machine of the character described, the combination of independent supplying means for hooks and eyes, a card feed moving the cards step by step, a carrier adapted to place a hook and eye on said card, means for fastening the hook and eye to the card, means to receive the hooks and eyes from the supplying means and discharge same to said carrier and means controlled by the card feed for operating said single hook and eye discharging means as required by the card feeding process.

7. In a machine of the character described, the combination of independent supplying means for hooks and eyes, a card feed moving the cards step by step, a carrier adapted to place a hook and eye on said card, means for fastening the hook and eye to the card, means to receive the hooks and eyes from the supplying means and discharge same to said carrier and common means controlled by the card feed for operating said single hook and eye discharging means as required by the card feeding process.

8. In a machine of the character described, the combination of independent supplying means for hooks and eyes, a card feed moving the cards step by step, a carrier adapted to place a hook and eye on said card, means for fastening the hook and eye to the card, means to receive the hooks and eyes from the supplying means and discharge same to said carrier and means controlled by the card feed for operating said single hook and eye discharging means as required by the card feeding process, and means for interrupting the hook and eye discharge means periodically as required by the card feed.

9. In a machine of the character described, the combination of card feeding means, means for attaching hooks and eyes to the cards, means for feeding the hooks and eyes to the cards, and means controlled by the card feeding means for periodically interrupting the hook and eye feeding means without interrupting the card feeding means or the hook and eye attaching means.

10. In a machine of the character described, the combination of card feeding means, means for attaching hooks and eyes to the cards, means for feeding the hooks and eyes to the cards, and means common to said hook and eye feeding means controlled by said card feeding means for simultaneously operating and simultaneously periodically interrupting the hook and eye feeding means without interrupting the card feeding means or the hook and eye attaching means.

11. In a machine of the character described, means for feeding eyes singly comprising a guide rail, a recessed member to which said rail delivers the eyes, a slide operating on the recessed member positively moving the eyes singly and means for holding the eye in position until positively moved by said slide.

12. In a machine of the character described, means for positioning hooks and eyes including a bar fastened on the machine frame, having at its lower end a recessed portion running longitudinally to the bar and another recess at the lower end of said first recess running transversely to the bottom of said first recess throughout the thickness of said bar, and of suitable size to have the bill of the hook pass through it, a plate covering said longitudinal recess having an opening at its lower end, a rail suitably shaped to lead an eye through said opening into said longitudinal recess, means for holding said eye yieldingly in said recess as delivered by said rail, a slide disposed in said recess adapted to push an eye contained therein to the end in line with said transverse recess, and means at the end of said longitudinal recess for holding said eye in said position to cause a hook while conveyed to the card to engage said eye, and means for operating said slide.

13. In a machine of the character described, means for positioning hooks and eyes including a bar fastened on the machine frame having at its lower end a recessed portion running longitudinally to the bar and another recess at the lower end of said first recess running transversely to the bottom of said first recess throughout the thickness of said bar and of suitable size to have the bill of a hook pass through it, a plate covering said longitudinal recess having an opening at its lower end, a rail suitably shaped to lead an eye through said opening into said longitudinal recess, a spring fixed on said bar operating through the bottom of said recess holding said eye in said recess as delivered by the rail, a slide disposed in said recess adapted to push an eye delivered by said rail to the end of said recess in line with said transverse recess, and means at the end of said longitudinal recess for holding said eye in said position to cause a hook while conveyed to the card to engage said eye, and means for operating said slide.

14. In a machine of the character described, means for positioning hooks and eyes including a carrier for conveying hooks singly and having an eye receiving recess, means for operating said carrier to cause the engagement of a hook and eye, and means for positively forcing the eye into said recess.

15. In a machine of the character described, the combination with a hook feeding and an eye feeding mechanism adapted to deliver a single hook and a single eye each into a suitable predetermined position, a gripper suitably operated having jaws shaped to seize a hook in and convey it from said position and causing said hook while conveyed to engage an eye in and pull it from its predetermined position; of means on said gripper jaws adapted to receive said engaged eye and means for securing the proper location of said eye in said eye receiving means.

16. In a machine of the character described, the combination with a hook feeding and eye feeding mechanism adapted to deliver a single hook and a single eye each into a suitable predetermined position, a gripper suitably operated having jaws shaped to seize a hook in and convey it from said position, and causing said hook while conveyed to engage an eye in and pull it from its predetermined position; of a recess in said gripper jaws suitably shaped to receive said engaged eye, and means for securing the proper location of said eye in said recess.

17. In a machine of the character described, the combination of a hook feeding and eye feeding mechanism adapted to deliver a single hook and a single eye each into a suitable predetermined position, a gripper suitably operated having jaws shaped to seize a hook in and convey it from said position, and causing said hook while conveyed to engage an eye in and pull it from its predetermined position; of means on said gripper jaws adapted to receive said engaged eye and a brush suitably fixed above the path in which said eye is conveyed, securing the proper location of said eye in said eye receiving means.

18. In a machine of the character described, the combination with a hook feeding and an eye feeding mechanism adapted to deliver a single hook and a single eye each into a suitable predetermined position, a gripper suitably operated having jaws shaped to seize a hook in and convey it from said position and causing said hook while conveyed to engage an eye in and pull it from its predetermined position; of a recess in said gripper jaws suitably shaped to receive said engaged eye and a brush suitably fixed above the path in which said eye is conveyed, securing the proper location of said eye in said recess.

19. In a machine of the character described, the combination with means for feeding hooks and eyes independently, means for engaging hooks and eyes in pairs and conveying them to a card and means for fastening said pairs to the card; of means for dislodging a member of said pair which has not been engaged by the other member and removing it from the path in which said pairs are conveyed, and means for receiving the dislodged member, 20. In a machine of the character described, the combination with means for feeding hooks and eyes independently, means for conveying hooks and eyes singly to a predetermined position, means for conveying hooks singly into engagement with said eyes; of means for dislodging a hook or eye not engaged with its corresponding member and removing it from the path in which said hooks are conveyed, and means for receiving the dislodged hook or eye.

21. In a machine of the character described, the combination with means for feeding hooks and eyes singly and independently to a predetermined position, means for carrying a hook from said position to engage an eye; of means operating in the path of said hook for securing the hook in said predetermined position and for dislodging an eye from its predetermined position, which does not become engaged by a hook.

22. In a machine of the character described, the combination with hook feeding and eye feeding means adapted to deliver a single hook and a single eye each into a suitable predetermined position, a gripper having arms and being reciprocatingly disposed and suitably operated to seize a hook in and convey it on its forward motion from said position, and causing said hook while conveyed to engage an eye in and lift it from its predetermined position; of suitably operating means for securing the hook in said predetermined position to be seized by said gripper and for removing an eye not lifted by said hook from its predetermined position before another eye is fed by said eye feeding means.

23. In a machine of the character described, the combination with hook feeding and eye feeding means adapted to deliver a single hook and a single eye each into a suitable predetermined position, a gripper having arms and being reciprocatingly disposed and suitably operated to seize a hook in and convey it on its forward motion from said position and causing said hook while conveyed to engage an eye in and lift it from its predetermined position; of a pusher disposed to have reciprocating motion and means causing said pusher to secure the hook in said predetermined position to be seized by the gripper, and to follow the forward motion of said gripper to remove an eye not lifted by said hook from its predetermined position before another eye is fed by said eye feeding means and to precede the return motion of said gripper.

24. In a machine of the character described, the combination with hook feeding and eye feeding means adapted to deliver a single hook and a single eye each into a suitable predetermined position, a gripper having arms and being reciprocatingly disposed and suitably operated to seize a hook in and convey it on its forward motion from said position, and causing said hook while conveyed to engage an eye in and lift it from its predetermined position; of a pusher disposed within said gripper arms to have reciprocating motion and a cam wheel operatively connected with said pusher causing same to secure the hook in said predetermined position to be seized by said gripper, and to follow the forward motion of said gripper to remove an eye not lifted by said hook from its predetermined position before another eye is fed by said eye feeding means, and to precede the return motion of said gripper.

25. In a machine of the character described, the combination with hook feeding and eye feeding means adapted to deliver a single hook and a single eye each into a suitable predetermined position, a gripper having arms and being reciprocatingly disposed and suitably operated to seize a hook in and convey it on its forward motion from said position and causing said hook while conveyed to engage an eye in and lift it from its predetermined position; of a pusher disposed within said gripper arms to have reciprocating motion and a cam wheel operatively connected therewith and operated by the gripper operating means, causing said pusher to secure the hook in said predetermined position to be seized by said gripper, and to follow the forward motion of said gripper to remove an eye not lifted by said hook from its predetermined position before another eye is fed by said eye feeding means and to precede the return motion of said gripper.

26. In a machine for sewing hooks and eyes on cards, the combination with hook and eye feeding means, means for feeding said cards step by step, a needle bar suitably operated having needles to sew said hooks and eyes on said cards, a cross bar adapted to receive and guide said needle bar, a sewing table adapted to carry and guide said cards; of a card presser foot, guide rods fixed thereon, guides on said cross bar and guides on said needle bar, all of said guides adapted to guide said rods in parallel to said needle bar, collars fixed on said rods between said cross bar and said needle bar, springs disposed on said rods between said cross bar and said collars, tending to press said presser foot on the card, the rod guides on said needle bar disposed to lift the card presser foot from the card after the needles have left said card and setting said foot on the card before the needles enter the card.

PAUL FERDINAND KLEINERT.

Witnesses:
HARRY B. JENKINS,
H. C. SENIOR.